(12) United States Patent
Abbey et al.

(10) Patent No.: US 12,332,463 B2
(45) Date of Patent: Jun. 17, 2025

(54) MICROSCOPY METHOD AND SYSTEM (71) Applicant: LA TROBE UNIVERSITY, Melbourne (AU)

(72) Inventors: Brian Abbey, Melbourne (AU); Eugeniu Balaur, Melbourne (AU)

(73) Assignee: LA TROBE UNIVERSITY, Melbourne (AU)

(*) Notice: Subject to any disclaimer, the term of this patent is extended or adjusted under 35 U.S.C. 154(b) by 480 days.

(21) Appl. No.: 17/297,974

(22) PCT Filed: Nov. 29, 2019

(86) PCT No.: PCT/IB2019/060305
§ 371 (c)(1),
(2) Date: May 27, 2021

(87) PCT Pub. No.: WO2020/110069
PCT Pub. Date: Jun. 4, 2020

(65) Prior Publication Data
US 2022/0091307 A1 Mar. 24, 2022

(30) Foreign Application Priority Data
Nov. 29, 2018 (AU) ................................ 2018904553

(51) Int. Cl.
G02B 5/00 (2006.01)
G01N 21/25 (2006.01)
(Continued)

(52) U.S. Cl.
CPC ........... *G02B 5/008* (2013.01); *G01N 21/255* (2013.01); *G01N 21/553* (2013.01);
(Continued)

(58) Field of Classification Search
CPC ........ G02B 5/008; G02B 21/06; G02B 21/16; G02B 21/34; G01N 21/255; G01N 21/553;
(Continued)

(56) References Cited

U.S. PATENT DOCUMENTS 5,836,872 A  11/1998 Kenet et al.
6,404,916 B1  6/2002 De La Torre-Bueno
(Continued)

FOREIGN PATENT DOCUMENTS

CN  1582394 A  2/2005
CN  1957245 A  5/2007
(Continued)

OTHER PUBLICATIONS

Lee Seung-Woo et al: "Highly Sensitive Biosensing Using Arrays of Plasmonic Au Nanodisks Realized by Nanoimprint Lithography", ACS NANO, vol. 5, No. 2, Jan. 11, 2011 (Jan. 11, 2011), pp. 897-904, XP055943779, US, ISSN: 1936-0851, DOI: 10.1021/nn102041m.
(Continued)

*Primary Examiner* — Mohamed K Amara
(74) *Attorney, Agent, or Firm* — Knobbe, Martens, Olson & Bear, LLP (57) ABSTRACT A sample holder for use in an optical microscope is disclosed. The sample holder includes a plasmonic layer defining a periodic array of sub-micron structures wherein the periodic array of sub-micron structures comprise an array of separated plasmonic regions. The regions may be a circle, a torus, an ellipse, a cross, rectangle, square, line, strip. Methods of performing reflection and fluorescence microscopy using such a sample holder and other sample holders are also disclosed.

27 Claims, 6 Drawing Sheets (51) Int. Cl.
- *G01N 21/552* (2014.01)
- *G01N 21/64* (2006.01)
- *G02B 21/06* (2006.01)
- *G02B 21/16* (2006.01)
- *G02B 21/34* (2006.01)
- *G01N 21/03* (2006.01)

(52) U.S. Cl.
CPC ....... *G01N 21/6458* (2013.01); *G01N 21/648* (2013.01); *G02B 21/06* (2013.01); *G02B 21/16* (2013.01); *G02B 21/34* (2013.01); *G01N 2021/0339* (2013.01); *G01N 2021/258* (2013.01)

(58) Field of Classification Search
CPC ............. G01N 21/6458; G01N 21/648; G01N 2021/0339; G01N 2021/258; G01N 21/554

See application file for complete search history.

(56) References Cited

U.S. PATENT DOCUMENTS

| | | | |
|---|---|---|---|
| 6,650,357 | B1 | 11/2003 | Richardson |
| 8,154,722 | B2 | 4/2012 | Yamada et al. |
| 8,536,545 | B2* | 9/2013 | Wu ............... G01N 21/6458 250/461.1 |
| 8,687,180 | B2 | 4/2014 | Cohen |
| 9,304,234 | B2 | 4/2016 | Liu et al. |
| 9,482,784 | B2 | 11/2016 | Yen et al. |
| 9,675,288 | B2* | 6/2017 | Yamakawa ......... G01N 21/658 |
| 9,744,793 | B2* | 8/2017 | Petiton ............. B42D 25/373 |
| 10,185,137 | B2 | 1/2019 | Dai et al. |
| 10,768,105 | B1 | 9/2020 | Mohan et al. |
| 11,150,038 | B1* | 10/2021 | Poole .................. F28F 13/18 |
| 11,506,881 | B2* | 11/2022 | Balaur ............... G02B 21/367 |
| 11,545,237 | B2 | 1/2023 | Meyer et al. |
| 11,774,361 | B2 | 10/2023 | Fereidouni et al. |
| 11,798,300 | B2 | 10/2023 | Cotte et al. |
| 2002/0115224 | A1* | 8/2002 | Rudel ................ B01J 19/0046 436/164 |
| 2003/0096302 | A1 | 5/2003 | Yguerabide et al. |
| 2005/0136549 | A1 | 6/2005 | Gholap et al. |
| 2007/0153267 | A1* | 7/2007 | Wang ................. G01N 21/648 356/301 |
| 2007/0178607 | A1 | 8/2007 | Prober et al. |
| 2008/0099667 | A1 | 5/2008 | Stark et al. |
| 2008/0252894 | A1 | 10/2008 | Lakowicz et al. |
| 2008/0252984 | A1* | 10/2008 | Lee ..................... G02B 5/045 359/625 |
| 2008/0274905 | A1* | 11/2008 | Greene ............. G01N 21/6428 506/17 |
| 2009/0060303 | A1 | 3/2009 | Douglass et al. |
| 2009/0153866 | A1 | 6/2009 | Yamamichi et al. |
| 2010/0062422 | A1 | 3/2010 | Ausserre |
| 2010/0142259 | A1* | 6/2010 | Drndic ............... H01L 21/0337 365/158 |
| 2010/0254589 | A1 | 10/2010 | Gallagher |
| 2010/0264032 | A1* | 10/2010 | Bazant ................ B01L 3/50273 204/627 |
| 2010/0290692 | A1 | 11/2010 | Macaulay et al. |
| 2010/0291575 | A1 | 11/2010 | Shamah et al. |
| 2011/0157593 | A1* | 6/2011 | Miyadera ........... G01N 21/553 356/445 |
| 2012/0113424 | A1 | 5/2012 | Suda et al. |
| 2013/0065777 | A1 | 3/2013 | Altug et al. |
| 2013/0279789 | A1 | 10/2013 | Elter et al. |
| 2014/0131559 | A1 | 5/2014 | Yen et al. |
| 2014/0168651 | A1* | 6/2014 | Guo .................. G01N 21/554 359/566 |
| 2014/0206101 | A1 | 7/2014 | Liu et al. |
| 2014/0327913 | A1 | 11/2014 | Pacifici et al. |
| 2014/0349278 | A1 | 11/2014 | Yamamoto |
| 2015/0002843 | A1 | 1/2015 | Yokogawa |
| 2015/0177140 | A1 | 6/2015 | Guo |
| 2016/0108256 | A1* | 4/2016 | Yang .................. H01B 5/14 428/419 |
| 2016/0110584 | A1 | 4/2016 | Remiszewski et al. |
| 2016/0258114 | A1* | 9/2016 | Firth .................. B42D 25/36 |
| 2016/0290926 | A1 | 10/2016 | Notingher et al. |
| 2016/0306157 | A1 | 10/2016 | Rho et al. |
| 2016/0334398 | A1 | 11/2016 | Weissleder et al. |
| 2016/0355869 | A1* | 12/2016 | Blair ................. G01N 21/648 |
| 2016/0357026 | A1 | 12/2016 | Astratov et al. |
| 2016/0370290 | A1 | 12/2016 | Raphael et al. |
| 2018/0045644 | A1 | 2/2018 | Baumgold |
| 2018/0066937 | A1 | 3/2018 | Ikeda et al. |
| 2018/0107038 | A1 | 4/2018 | Chen et al. |
| 2018/0202918 | A1 | 7/2018 | Tanaka et al. |
| 2019/0071779 | A1 | 3/2019 | Hamers et al. |
| 2019/0154652 | A1 | 5/2019 | Ghosh et al. |
| 2019/0195809 | A1* | 6/2019 | Agarwal ............ G01N 21/9036 |
| 2019/0317011 | A1 | 10/2019 | Hu |
| 2020/0116987 | A1 | 4/2020 | Kleppe et al. |
| 2020/0142173 | A1* | 5/2020 | Balaur ................. G02B 21/34 |
| 2020/0264043 | A1* | 8/2020 | Allen ................. G01J 3/0229 |
| 2020/0285043 | A1* | 9/2020 | Nyga ................ G02B 26/007 |
| 2020/0319382 | A1* | 10/2020 | Guo ................... G02B 5/008 |
| 2020/0326282 | A1* | 10/2020 | Singamaneni ........ B32B 27/283 |
| 2021/0181391 | A1 | 6/2021 | Subramaniyam et al. |
| 2022/0059866 | A1* | 2/2022 | Mukherjee ............ H01M 4/463 |
| 2022/0091407 | A1 | 3/2022 | Abbey et al. |
| 2022/0092824 | A1* | 3/2022 | Abbey .................. G06V 20/69 |
| 2022/0215533 | A1* | 7/2022 | Abbey ................. G06V 20/698 |
| 2022/0235415 | A1* | 7/2022 | Fretes ............. G01N 33/48721 |
| 2022/0381984 | A1* | 12/2022 | Li ........................ G01N 21/774 |
| 2023/0266291 | A1* | 8/2023 | Myrick .................. H10K 30/00 |

FOREIGN PATENT DOCUMENTS

| | | |
|---|---|---|
| CN | 101031789 A | 9/2007 |
| CN | 101470219 | 9/2010 |
| CN | 102317781 A | 1/2012 |
| CN | 102460171 A | 5/2012 |
| CN | 103018167 A | 4/2013 |
| CN | 101952697 | 8/2014 |
| CN | 104919299 A | 9/2015 |
| CN | 105974571 A | 9/2016 |
| CN | 205691505 U | 11/2016 |
| CN | 108474874 A | 8/2018 |
| DE | 10329195 A1 | 1/2005 |
| DE | 102012214932 | 2/2014 |
| EP | 2653903 | 10/2013 |
| EP | 3121587 | 1/2017 |
| EP | 2146229 | 4/2019 |
| JP | 2001133618 | 5/2001 |
| JP | 2007-501391 | 1/2007 |
| JP | 2007192806 | 8/2007 |
| JP | 2007-538264 | 12/2007 |
| JP | 2009222401 | 10/2009 |
| JP | 2009223123 | 10/2009 |
| JP | 2010009025 | 1/2010 |
| JP | 2011-53151 | 3/2011 |
| JP | 2011-252928 | 12/2011 |
| JP | 2012159792 | 8/2012 |
| JP | 2013-142546 | 7/2013 |
| JP | 2013-231682 | 11/2013 |
| JP | 2015-12128 | 1/2015 |
| JP | 2016212126 | 12/2016 |
| JP | 2015-514225 | 3/2018 |
| JP | 2018-528405 | 9/2018 |
| JP | 2018-532132 | 11/2018 |
| KR | 20120075189 | 12/2012 |
| TW | 201418698 | 5/2014 |
| WO | WO 2003/073817 | 9/2003 |
| WO | WO 2005/017570 | 2/2005 |
| WO | WO 2005/114298 | 12/2005 |
| WO | WO 2008/039212 | 4/2008 |
| WO | WO 2009/072098 | 6/2009 |
| WO | WO 2009/089292 | 7/2009 |
| WO | WO 2010/075033 | 7/2010 |
| WO | WO 2010/132890 | 11/2010 |
| WO | WO 2011/163624 | 12/2011 |

(56) References Cited

FOREIGN PATENT DOCUMENTS

| WO | WO 2013/089996 | 6/2013 |
| WO | WO 2014/053955 | 4/2014 |
| WO | WO 2015005904 | 1/2015 |
| WO | WO 2015/056584 | 4/2015 |
| WO | WO 2015/140362 | 9/2015 |
| WO | WO 2015/199976 | 12/2015 |
| WO | WO 2017/051195 | 3/2017 |
| WO | WO 2017/109175 | 6/2017 |
| WO | WO 2017/135430 | 8/2017 |
| WO | WO 2017/161097 | 9/2017 |
| WO | WO 2018/107038 | 6/2018 |
| WO | WO 2018/152157 | 8/2018 |
| WO | WO 2018/213881 | 11/2018 |
| WO | WO 2020/110069 | 6/2020 |
| WO | WO 2020/110070 | 6/2020 |
| WO | WO 2020/110071 | 6/2020 |
| WO | WO 2020/110072 | 6/2020 |

OTHER PUBLICATIONS

Mudachathi Renilkumar et al: "Design of a 1-7 colorimetric sensing platform using reflection mode plasmonic colour filters", Proceedings of SPIE; [vol. 10524], SPIE, US, vol. 10346, Aug. 25, 2017 (Aug. 25, 2017), pp. 103460D-103460D, XP060092566.
Balaur Eugenio et al: "Electron-beam induced diamond-like-carbon passivation of plasmonic devices", Biomedical Photonics and Optoelectronic Imaging : Nov. 8-10, 2000, Beijing, China; SPIE, Bellingham, Wash., US, vol. 9668, Dec. 22, 2015 (Dec. 22, 2015), pp. 966817-966817.
Langley D et al: "Dual pitch plasmonic devices for polarization enhanced colour based sensing", Proceedings of SPIE, SPIE, US, vol. 10013, Dec. 9, 2016 (Dec. 9, 2016).
Kan T et al: "Sub-micron aperture plate for intracellular calcium transient measurement", Tranducers '05 : [Jun. 5-9, 2005] ; Digest of Technical Papers, IEEE Operations Center, Piscataway, NJ, vol. 2, Jun. 5, 2005 (Jun. 5, 2005).
Shan Mingguang et al.: "Refractive index variance of cells and tissues measured by quantitative phase imaging", Optics Express, [Online] vol. 25, No. 2, Jan. 23, 2017 (Jan. 23, 2017), pp. 1573, XP055918186, ISSN: 1094-4087, DOI: 10.1364/OE.25.001573 Retrieved from the Internet: URL: https://www.osapublishing.org/viewmedia.cfm?URI=oe-25-2-1573> retrieved on Jul. 4, 2022].
European Supplementary Search Report for EP Application No. 19890517.6 dated Aug. 3, 2022 in 14 pages.
European Extended Search Report for EP Application No. 19889218.4 dated Aug. 9, 2022 in 10 pages.
European Search Report for EP Application No. 19889220.0 dated Aug. 12, 2022 in 14 pages.
European Search Report for EP Application No. 19890518.4 dated Aug. 4, 2022 in 9 pages.
Motevich I. G. et al: "Application of Plasmonic Silver Films in Histology for Contrast Enhancement", Journal of Applied Spectroscopy, vol. 79, No. 4, Sep. 2012 (Sep. 2012), pp. 632-636.
Wang X et al: "Self-Referenced Smartphone-Based Nanoplasmonic Imaging Platform for Colorimetric Biochemical Sensing", Analytical Chemistry, vol. 89, No. 1, Dec. 15, 2016 (Dec. 15, 2016), pp. 611-615.
Extended European Search Report for EP Application No. 19889220.0, dated Nov. 10, 2022.
Notice of Reasons for Rejection in JP Patent Application No. 2021-230110 (English translation), dated Apr. 11, 2023 in 6 pages.
Office Action for CN Application No. 201980090294.2 dated Feb. 2, 2023 and Search Report in 9 pages (no English translation available).
Notice of Reasons for Rejection in JP Patent Application No. 2021-530111, dated May 30, 2023 and English Translation, in 13 pages.
U.S. Appl. No. 17/297,977, filed May 27, 2021, Abbey et al.
U.S. Appl. No. 17/297,979, filed May 27, 2021, Abbey et al.
U.S. Appl. No. 17/297,980, filed May 27, 2021, Abbey et al.
Altunbay, D. et al. Color Graphs for Automated Cancer Diagnosis and Grading, Mar. 2010.
Arora, P. and Krishnan, A. "Fourier plane colorimetric sensing using broadband imaging of surface plasmons and application to biosensing," Dec. 16, 2015.
Huang, Fu Min et al. "Nanohole Array as a Lens," Jun. 2008.
Huang, Fu Min et al. "Focusing of Light by a Nano-Hole Array," Dec. 2006.
Jiang, Jing et al. "Plasmonic Nano-arrays for Ultrasensitive Bio-Sensing," published Aug. 28, 2018.
Schmid, P. "Segmentation of Digitized Dermatoscopic Images by Two-Dimensional Color Clustering," Feb. 1999.
Wisaeng, K and Sa-Ngiamvibool, W. "Improved fuzzy c-means clustering in the process of exudates detection using mathematical morphology," Mar. 7, 2017.
Wu, Li and Qu Xiaogang "Cancer Biomarker Detection: Recent Achievements and Challenges," Mar. 5, 2015.
Carr, R.J.G., et al. "Submicron optical sources for single macromolecule detection." Proceedings of the SPIE, SPIE, Bellingham, VA, US, vol. 1796, Sep. 8, 1992, pp. 152-156.
Balaur, E., et al. "Continuously tunable, polarization controlled, colour palette produced from nanoscale plasmonic pixels." Scientific reports 6 (2016): 28062.
Office Action dated Aug. 22, 2023 for Chinese Patent Application No. 201980090294.2.
Office Action for Japanese Patent Application No. 2021-530110.
Office Action dated Sep. 14, 2023 for Canadian Patent Application No. 3,121,434.
Office Action dated Sep. 14, 2023 for Canadian Patent Application No. 3,121,425.
Office Action dated May 3, 2024 for India patent application No. 202127023681.
Office Action and Search Report dated Nov. 20, 2023 for China patent application No. 201980090311.2.
Office Action and Search Report dated Jan. 3, 2024 for China patent application No. 201980090290.4.

\* cited by examiner

FIG. 1a

Hexagonal

Rectangular

MICROSCOPY METHOD AND SYSTEM

FIELD OF THE DISCLOSURE

The present disclosure relates to the field of optical microscopy. In one form the disclosure provides systems and methods of using an optical microscope and an enhanced sample holder.

BACKGROUND OF THE DISCLOSURE

PCT/AU2018/050496 in the name of La Trobe University (the entire contents of which are herein incorporated by reference) discloses systems and methods of optical microscopy which provide enhanced image contrast through use of a sample holder having a plasmonic layer including a periodic array of sub-micron structures. In the present disclosure reference to a nanoslide is reference to a sample holder in accordance with the teaching of PCT/AU2018/050496, or the Applicant's co-pending Australian patent application 2018904553, filed on 29 Nov. 2018, entitled "Microscopy method and system" and the International patent application claiming priority to AU2018904553 which was filed on the same day as present application, the contents of both being incorporated herein by reference for all purposes. Microscopy methods using such a sample holder are called or histoplasmonics or colour contrast microscopy herein, which is abbreviated to CCM. The sample is placed on the sample holder adjacent the plasmonic layer. In use, the sample and sample holder are illuminated and an image of the sample is created. The inventors have observed that through interaction of the light with the sample and the plasmonic layer, a colour contrast is exhibited in the observed image. In particular, areas of the sample having different dielectric constant appear in the image with different colours. An increase in the intensity contrast is also achieved. In contrast to CCM, images obtained from conventional optical microscopy using a non-specific stain typically only exhibit an intensity contrast in a single colour, which corresponds to the stain used. Even when a counter-stain or biomarker is used, these conventional techniques only provide images in distinct colours.

SUMMARY OF THE DISCLOSURE

As will be known to those skilled in the art, reflected light microscopy, in broad concept, is a microscopy technique that uses light reflected from the sample to form an image of the sample. Whilst the exemplary embodiments of the nanoslide disclosed in PCT/AU2018/050496 can be used in reflection microscopy without modification, the inventors have determined that such sample holders can be enhanced to improve its use in reflected light microscopy. In the present specification "forming an image" includes forming a human perceptible image, e.g. by focusing light so that a user can perceive an image of the sample (or part thereof); or generating a digital or photographic image of the sample (or part thereof) for storage, transmission, display or other downstream process.

Accordingly, a first aspect the present invention provides a sample holder for use in an optical microscope, the sample holder including:
 a plasmonic layer defining a periodic array of sub-micron structures; and
 wherein the sample holder is configured to support an object such that the periodic array of sub-micron structures is adjacent the object when supporting the object;
 wherein the periodic array of sub-micron structures comprise an array of separated plasmonic regions.

Accordingly, a second aspect of the present invention provides a sample holder for use in an optical microscope, the sample holder including:
 a plasmonic layer extending over a region of the sample holder, the plasmonic layer defining a periodic array of sub-micron structures; and
 wherein the sample holder is configured to support an object such that the periodic array of sub-micron structures is adjacent the object when supporting the object;
 wherein within the region the periodic array of sub-micron structures cause the plasmonic layer to fill, by area, not more than 80% of said region.

In some forms of the second aspect the periodic array of sub-micron structures cause the plasmonic layer to fill, by area, not more than one of 75%, 70%, 65%, 60%, 55%, 50%, 45%, 40%, 35%, 30%, 25%, 20%, 15%, 10%, 5% of the region. The region can cover an entire side of the sample holder.

In some embodiments of either the first or second aspects of the invention, the plasmonic regions can be islands of plasmonic material. In other embodiments the plasmonic regions can be lines or strips of plasmonic material separated from a neighbouring line(s) or stripe(s) by a non-plasmonic strip or line to form a one dimensional array of separated plasmonic regions.

In some embodiments of either the first or second aspects of the invention, sub-micron structures may be arranged in a periodic array with a separation between the sub-micron structures in the range of 200 nm to 500 nm. The sub-micron structures may have a largest dimension in the range of 50 nm to 300 nm. Most preferably the sub-micron structures are regions of plasmonic material about between 100 nm and 200 nm across. The plasmonic regions can be shaped as any one or more of: a circle, a torus, an ellipse, a cross, rectangle, square.

In some embodiments of either the first or second aspects of the invention, the plasmonic layer may be formed from one or more metals selected from any one of: Al, Ag, Au, Ni, Pt and Pd. The plasmonic layer may have a thickness in the range of 20 nm to 300 nm.

In some embodiments of either the first or second aspects of the invention, the array of separated plasmonic regions may be a regular array with equal spacing between neighbouring plasmonic regions in a first and a second direction. Preferably the first and a the second directions are orthogonal directions. However, the array may have different spacing in the first and second directions.

In some embodiments of either the first or second aspects of the invention, the sample holder includes a substrate connected to at least a portion of a first surface of the plasmonic layer to provide mechanical support for the plasmonic layer. In some embodiments, the sample holder includes an optically clear protective layer bonded to an upper side of the plasmonic layer to isolate the plasmonic layer. The optically clear protective layer may have a thickness less than 150 nm. In some embodiments the optically clear protective layer may have a thickness less than 80 nm. The optically clear protective layer may include any one or more of: silicon oxide, silicon nitride, transparent metal oxide, and a polymer. The sample holder can comprise a microscope slide.

In some embodiments of either the first or second aspects of the invention, the sample holder enables light, which is transmitted through the sample to the plasmonic layer to be reflected from the sample holder for the creation of images comprising the reflected light.

In some embodiments of either the first or second aspects of the invention, in use incident light illuminates the sample and sample holder and interacts with the sample and the plasmonic layer. The reflected light includes a characteristic spectra in which each colour is dependent on the localised dielectric constant of the sample. In this way, a colour image encoding localised dielectric constants of the sample can be formed from the reflected light.

The present inventors have further realised that a nanoslide, as described herein or in PCT/AU2018/050496 can also advantageously be used for fluorescence microscopy. Most advantageously, this can be performed in a microscopy arrangement adapted for reflected light microscopy.

Accordingly, the present invention also provides a method of imaging a sample comprising:
Providing a sample holder having an upper surface face and a lower surface, the upper surface having a plasmonic layer associated therewith, the plasmonic layer including a periodic array of sub-micron structures;
Applying the sample to the upper surface of the sample holder;
Illuminating the sample with light so that said light interacts with the sample and sample holder;
Receiving light emitted from the sample by fluorescence and forming an image thereof.

The method can further include receiving light after interaction with said sample and sample holder and forming at least one image thereof, wherein at least one localised structural property of the sample is visible in the image based on the colour of the received light. Such imaging is described in PCT/AU2018/050496 in greater detail. Herein an image so formed in this manner is termed a colour contrast image. Advantageously, in this way a sample mounted on the sample holder can be imaged using fluorescence microscopy in addition to using colour contrast imaging.

The image formed from the light emitted from the sample by fluorescence can be formed in a first time period, and the colour contrast image can be formed in a second time period. In some embodiments, illuminating the sample with light so that said light interacts with the sample and sample holder can include using a first illumination spectrum in the first time period, and a second illumination spectrum in the second time period. The first illumination spectrum can be selected on the basis of a fluorescence property of the sample. In some cases the first and second illumination spectra may be the same.

In some embodiments receiving light emitted from the sample by fluorescence includes filtering (e.g. based on wavelength or spatially filtering) light received from the sample and/or sample holder to minimise received light from sources other than said fluorescence.

In a preferred form, the method includes illuminating the sample from the side of the sample holder on which the sample is positioned, and receiving light emitted from the sample by fluorescence, and also light which has after interacted with said sample and sample holder, from the same side as said illumination.

It should be noted that the term upper surface and lower surface are not intended to reference a specific orientation of the sample holder either during sample preparation or use.

In embodiments of the present invention the method can include spatially correlating an image formed from the light emitted from the sample by fluorescence, and a colour contrast image. The method can include forming a combined image including an image formed from the light emitted from the sample by fluorescence, and a colour contrast image. Multiple images formed from the light emitted from the sample by fluorescence and/or multiple colour contrast images may be combined into a single image. The combination may be performed optically (e.g. during optical image formation) or digitally (e.g. by combining data values representing said images).

The sample is preferably a biological sample.

The sample holder used in embodiments of the present aspect of the invention can be a sample holder according to an embodiment of PCT/AU2018/050496, but most preferably is a sample holder in accordance with an embodiment of the first aspect of the present invention.

Images formed in the manners set out above may be used in histology and pathology in ways that may be apparent to those skilled in the art.

In a further aspect there is provided a system for forming an image using an embodiment of any one of the aspects set out above. The system can include a reflected light microscope having an image forming system, and an illumination system, and sample holder having an upper surface and a lower surface, the upper surface having a plasmonic layer associated therewith, the plasmonic layer including a periodic array of sub-micron structures. The system can include an image capture system to generate at least one image of the sample.

Embodiments of the present invention can be used to generate digital images subject to automated or partially automated methods of identifying a structure as taught in Applicant's co-pending Australian patent application 2018904551, filed on 29 Nov. 2018, entitled "Automated method of identifying a structure" and the International patent application claiming priority to AU2018904551 which was filed on the same day as present application, the contents of both being incorporated herein by reference for all purposes.

Embodiments of an aspect of the present disclosure can be used in embodiments of the teaching of the applicant's co-pending Australian patent application 2018904550, filed on 29 Nov. 2018, entitled "Method of identifying a structure" and the International patent application claiming priority to AU 2018904550 which was filed on the same day as the present application, and is incorporated herein for all purposes.

BRIEF DESCRIPTION OF THE DRAWINGS

Illustrative embodiments of the present invention will be described by way of non-limiting example with reference to the accompanying drawings. The drawings filed with the present international application include colour images used in, and arising from use of embodiments of the present invention. The colour information forms part of the disclosure of the embodiments. Should black and white or greyscale reproduction of the images occur, colour disclosure can be obtained from the originally filed documents. In the drawings.

DETAILED DESCRIPTION OF THE EMBODIMENTS

Figure 1A:
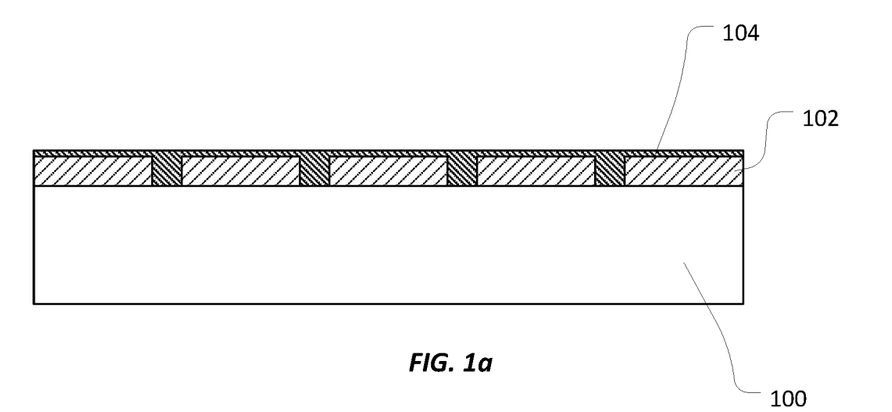
FIG. 1a illustrates details of an exemplary sample holder used in embodiments of the present disclosure.
Figure 1B:
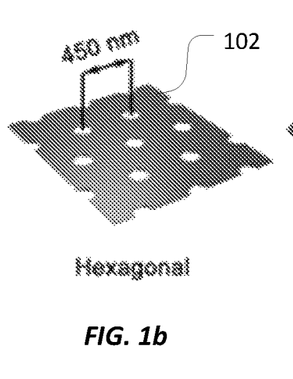
FIGS. 1b and 1c illustrate examples in which the plasmonic layer includes an array of sub-micron apertures.
Figure 1C:
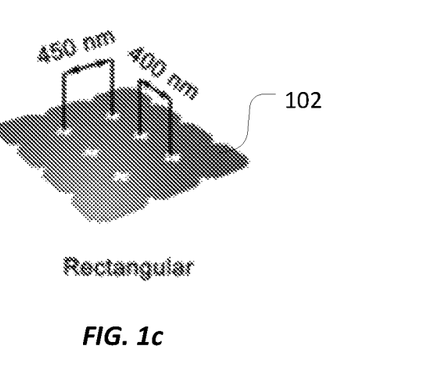

FIG. 1a shows an embodiment of a sample holder used in an example of the present disclosure. FIG. 1a shows a cross section through a sample holder suitable for use in the present invention. The sample holder 100 includes a substrate, on which is deposited a plasmonic layer 102. FIGS. 1b and 1c show two types of plasmonic layer as exemplified in PCT/AU2018/050496 with sub-micron arrays of that have been fabricated and may be used in an embodiment. The layers are each silver films with a thickness of 150 nm, although other suitable materials can be used. FIG. 1b has sub-micron arrays in the form of circular shaped nanoapertures with a 450 nm period arranged in a hexagonal pattern. FIG. 1c has cross-shaped nanoapertures on a rectangular pattern. The cross-shaped nanoapertures have a 450 nm period in one direction (defined here as the 0° direction) and a 400 nm period in the orthogonal direction (defined as the 90° direction). These arrays have a Surface Plasmon Polariton (SPP) resonance mode in the 470-550 nm range (which is within the visible region of the electromagnetic spectrum). To protect the surface of the plasmonic layer 102, a layer 104 (10 nm±1 nm) of hydrogen silsesquioxane (HSQ), a glass-like material, is deposited after fabrication of the plasmonic layer 102. After capping with HSQ, the sample holder 100 has an upper surface similar to that of a conventional microscope slide on which a sample may be supported. In use, the HSQ layer also presents a polar surface which aids tissue adherence. In other embodiments a metal oxide capping layer e.g. $SiO_2$ can be used in place of HSQ.

Figure 2A:
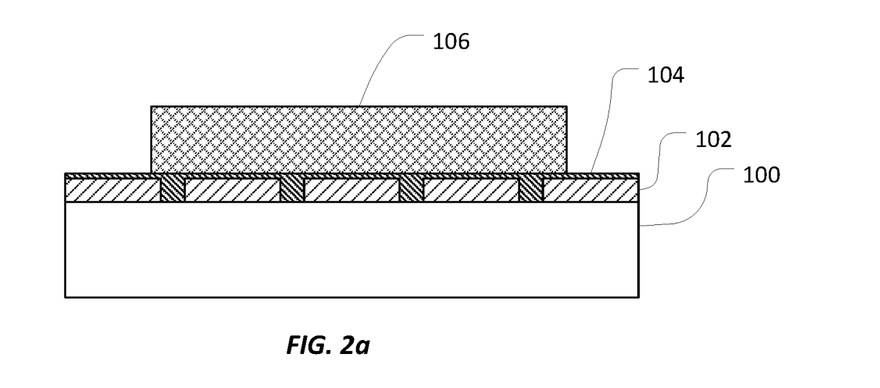
FIG. 2a illustrates an example sample holder from FIG. 1a on which is positioned a sample for use in embodiments of the present invention.

Samples to be imaged are prepared and placed on sample holders in accordance with an embodiment of PCT/AU2018/050496 in the name of La Trobe University or the Applicant's co-pending Australian patent application 2018904553, filed on 29 Nov. 2018, entitled "Microscopy method and system" and the International patent application claiming priority to AU2018904553 which was filed on the same day as the present application. A sample 106, typically a slice of a biological tissue, which needs not be stained or labelled in the preferred embodiment of the present invention, is placed on the sample holder adjacent the plasmonic layer, as shown in FIG. 2a.

Figure 3A:
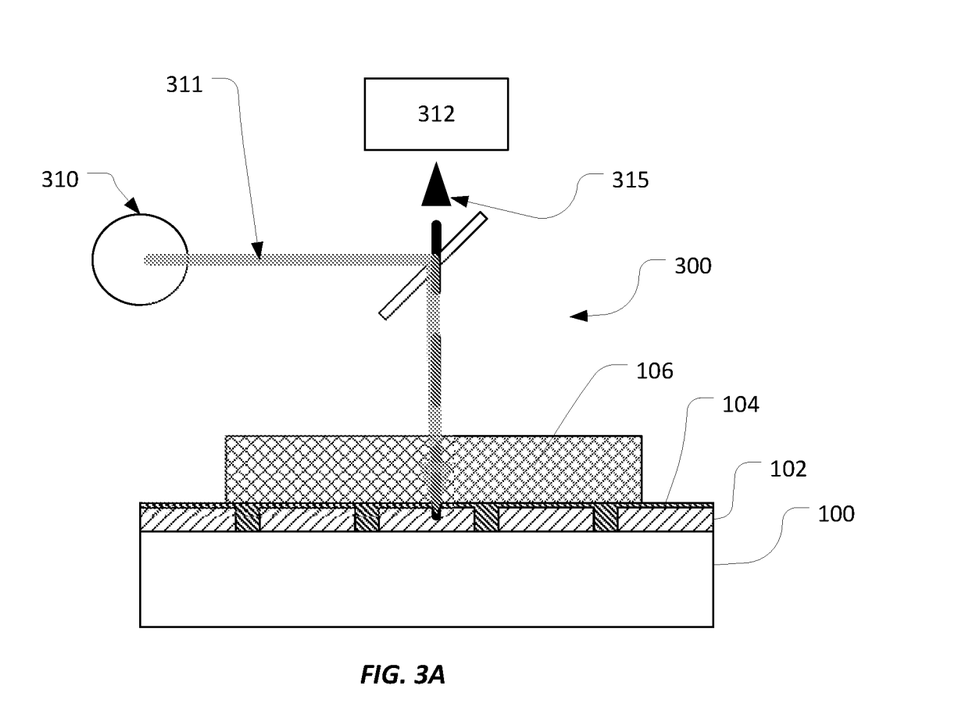
FIG. 3A is a schematic diagram of a system used to perform reflected light microscopy.

FIG. 3A is a schematic representation of a system 300 in which the sample holder 100 is used in reflected light microscopy. Techniques and equipment used in reflected light microscopy with conventional slides are known to those skilled in the art and in order to avoid obscuring the details of the present invention, the descriptions of known techniques will be omitted.

The system 300 includes a light source 310 which emits incident light 311 to illuminate the sample 106. The illumination is performed in this example from the side of the sample holder on which the sample is positioned. Reflected light 315 is reflected back to an imaging system 312 for creation of a colour contrast image. The sample holder 100 is a nanoslide having a plasmonic layer.

Figure 4:
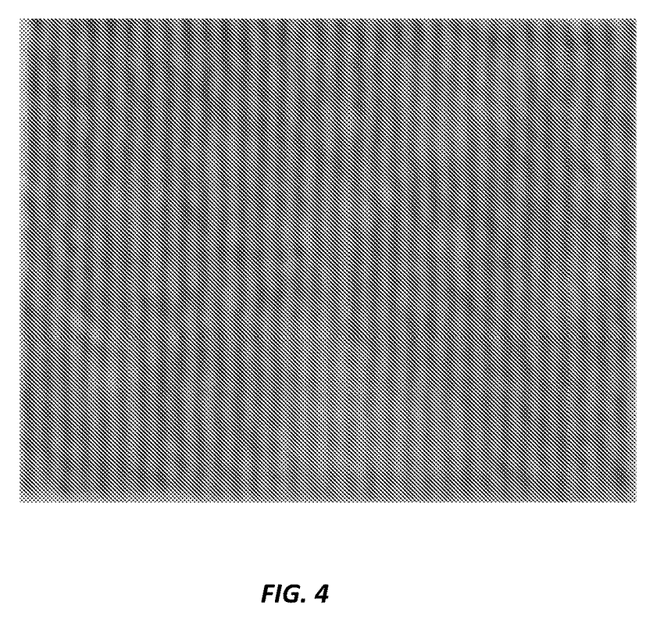
FIG. 4 illustrates an image captured using CCM (using a nanoslide) in reflection mode.

When system 300 is used in reflected light microscopy, the reflected light which forms the image has interacted with the plasmonic layer of the sample holder and the sample such that it possesses a reflection spectrum, which varies according to the local dielectric constant of the sample. Thus the reflected light image displays colour contrast. FIG. 4 illustrates a reflection image of a thin section (70 nm) of the optical nerve of a mouse. Tissue was prepared in a convention manner and embedded in epoxy resin. 70 nm thick sections were cut on a Leica UC7 ultramicrotome. The image was captured using a 20× magnification and taken in reflection mode. In the image visible stripes arise from the fact that the submicron structures in the plasmonic layer of the nanoslide include structure with a periodicity of ~450 nm, which lies in the visible region of the Em spectrum and therefore producing visible fringes in the image. Using smaller periodicities or different shaped arrays (e,g, hexagonal) can avoid such artefacts.

Figure 5A:
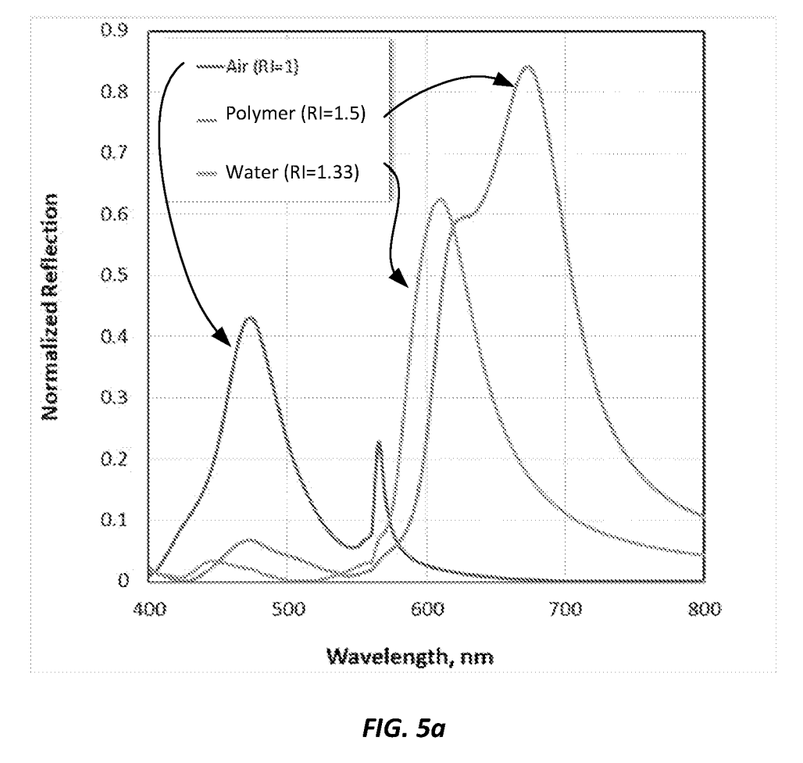
FIG. 5 illustrates exemplary light reception spectra when a nanoslide is used in reflection mode, for the case of no sample (air), a sample consisting of water, a sample consisting of a material with a refractive index of 1.5 (e.g. a polymer).

The specific reflection spectrum will be somewhat similar to the inverse of the normalised transmission spectra (e.g. as illustrated in PCT/AU2018/050496) with troughs appearing at the peaks in the transmission spectra. However there may be different sets of plasmon resonance modes present. FIG. 5 illustrates exemplary simulated light reception spectra when a nanoslide is used in reflection mode, for three sample cases as follows:

a sample with R=1 i.e. no sample, or the sample is air
a sample with R=1.33 (e.g. a sample consisting of water)
a sample with R=1.5 (e.g. a material, such as a polymer)

The simulated spectra are based on a nanoslide having circular islands of plasmonic material of radius 90 nm arranged in an array having a separation of 480 nm in a first direction in a hexagonal lattice array.

Compared to the illustrative examples of PCT/AU2018/050496, in which the plasmonic layer covers an entire region of the nanoslide with only small voids in it provided by the sub-micron structures, it has been found that when used in reflection microscopy it can be advantageous to provide a plasmonic layer region that because of the arrangement of a its sub-micron structures fills less (by area) of the region covered by the plasmonic layer. In some cases the plasmonic layer region can be filled (by area) by not more than one of 75%, 70%, 65%, 60%, 55%, 50%, 45%, 40%, 35%, 30%, 25%, 20%, 15%, 10%, 5% of the region The reduction in fill factor can be advantageous in reflection microscopy because it reduces reflection of incident light (i.e. allows more transmission), such that the spectral peaks in the reflected light are more easily discernible from the troughs, which enhances the colour contrast effect in the received image.

Figure 5B:
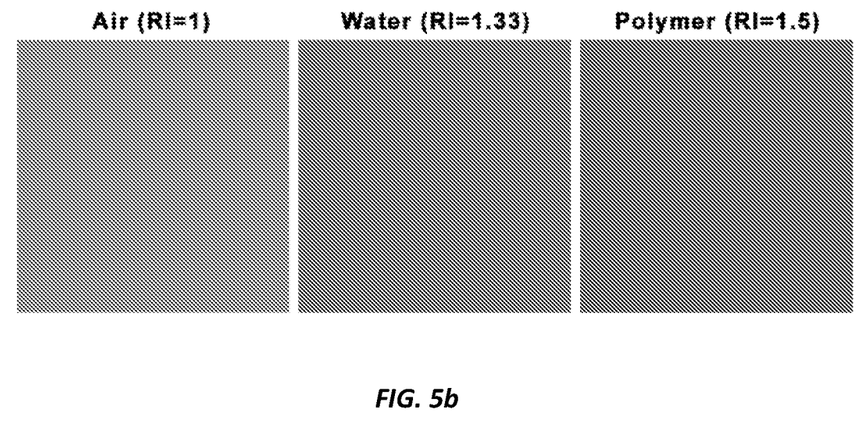

FIG. 5b illustrate a simulated image of such samples showing the resultant visible colours from such samples. As can be seen:

the RI=1 sample (left) appears blue, corresponding to the position of the peak in its reflection spectrum;

the RI=1.33 sample (middle) appears orange, corresponding to the position of the peak in its reflection spectrum; and the RI=1.5 sample (right) appears red, corresponding to the position of the peak in its reflection spectrum;

demonstrating that images formed using a nanoslide in reflection microscopy display colour contrast based on the dielectric constant of the sample which is related to the refractive index of the sample.

Importantly use of the nanoslide enables such colour contrast to be obtained without staining the sample, and when using substantially transparent samples. Accordingly the reflected light received includes light reflected from the plasmonic layer, as opposed to the upper surface of the sample. It also means that absorption within the sample itself is relatively low.

The microscope used conventional optical microscope with eyepieces for viewing by a user, however it can alternatively or additionally include an image capture system to generate a digital image for display, storage or other later use. In some forms the microscope can form part of an automated slide scanner. The system 300 can include a user terminal for display of captured digital images of the sample, and a data storage system for storing captured images.

When performing reflected light microscopy using a nanoslide, the present inventors have determined that the plasmonic layer can be specialised to yield improved results in some cases. In particular the periodic array of sub-micron structures can comprise an array of separated plasmonic regions. The plasmonic regions can be islands of plasmonic material separated by gaps. The plasmonic regions will typically be arranged in a periodic array with a separation between the sub-micron structures in the range of 200 nm to 500 nm. Each plasmonic region may have a largest dimension in the range of 50 nm to 300 nm. Most preferably the sub-micron structures are regions of plasmonic material between about 100 nm and 200 nm across. The plasmonic regions can be shaped as any one or more of: a circle, a torus, an ellipse, a cross, rectangle, square.

As set out in PCT/AU2018/050496, a plasmonic layer may be formed from one or more metals such as: Al, Ag, Au, Ni, Pt or Pd. The plasmonic layer may have a thickness in the range of 20 nm to 300 nm.

FIGS. 1d to 1j illustrate examples of such periodic arrays of sub-micron structures which comprise arrays of separated plasmonic regions.

Figure 1D:
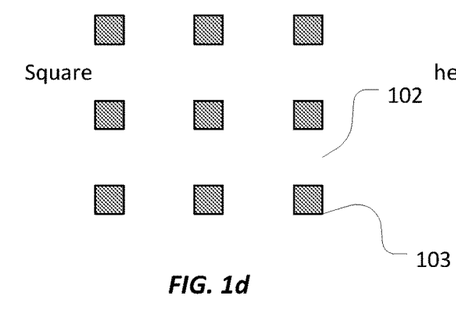
FIGS. 1d to 1j illustrate examples where the sub-micron structures in the plasmonic layer are separated plasmonic regions. The present invention should not be considered to be limited to use of sample holders with the particular microstructure arrays illustrated FIGS. 1b to 1j.

FIG. 1d illustrates a plasmonic layer 102 including a regular rectangular array of square plasmonic regions 103. The spacing of the plasmonic regions 103 in the first and second directions are equal.

Figure 1E:
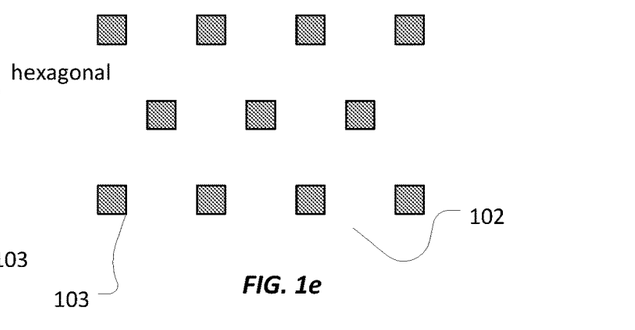

FIG. 1e illustrates a plasmonic layer 102 including an array of square plasmonic regions 103 arranged with equal spacing of the plasmonic regions 103 in the first and second directions, but with each row offset from its neighbour to form a hexagonal array of plasmonic regions 103. The separation between regions in the first and second (x and y) directions may be the same (as illustrated) or different.

Figure 1F:
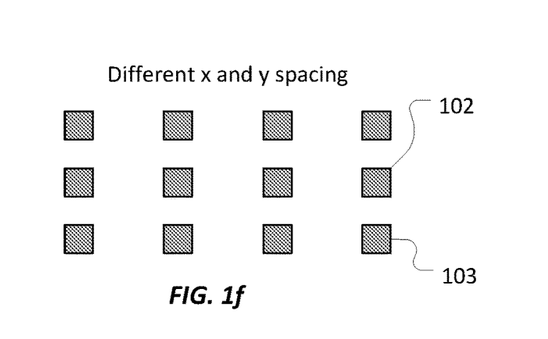

FIG. 1f illustrates a plasmonic layer 102 including an array of square plasmonic regions 103 in which the spacing of the plasmonic regions 103 in the first and second directions are unequal. As set out in PCT/AU2018/050496 such an example can enable the use of polarised illumination to vary the spectrum of the received light by switching the relative polarisation of the received light with respect to the rows and columns of the array.

Figure 1G:
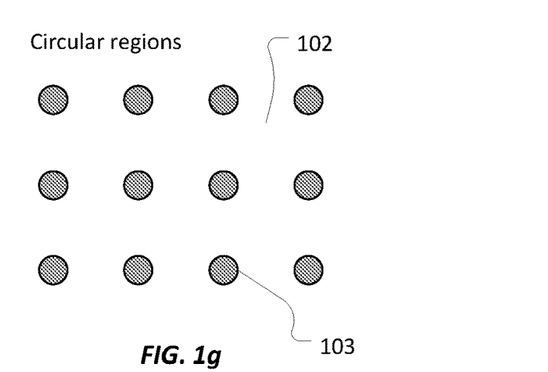

FIG. 1g illustrates an example plasmonic layer 102 including circular plasmonic regions 103. In this example the spacing of the plasmonic regions 103 in the first and second directions are equal, but other array arrangements could be used.

Figure 1H:
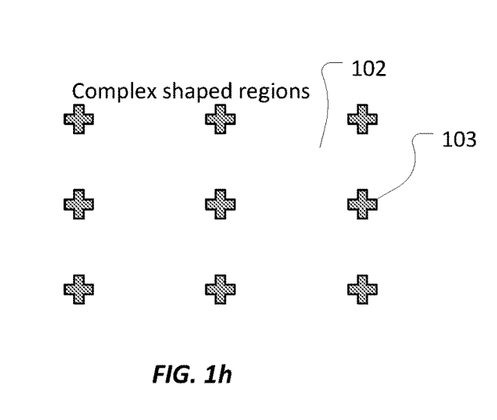

FIG. 1h illustrates an example plasmonic layer 102 including cross shaped plasmonic regions 103. In this example the spacing of the plasmonic regions 103 in the first and second directions are unequal equal, but other array arrangements could be used.

Figure 1I:
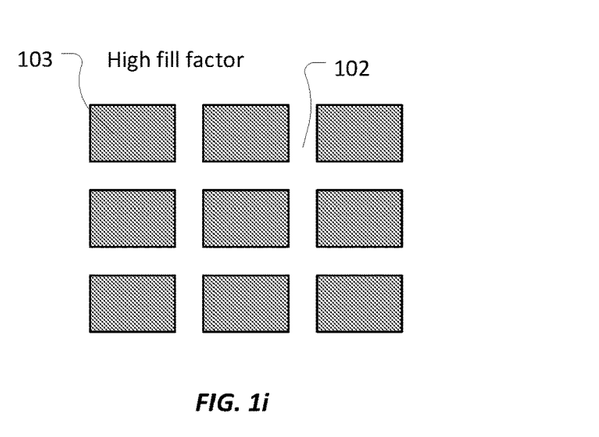

FIG. 1i illustrates an example plasmonic layer 102 including rectangular shaped plasmonic regions 103. However unlike the other embodiments the spacing between neighbouring plasmonic regions is relatively narrow. This yields a plasmonic layer in which the plasmonic regions occupy a fraction of the plasmonic layer greater than 50% by area.

Figure 1J:
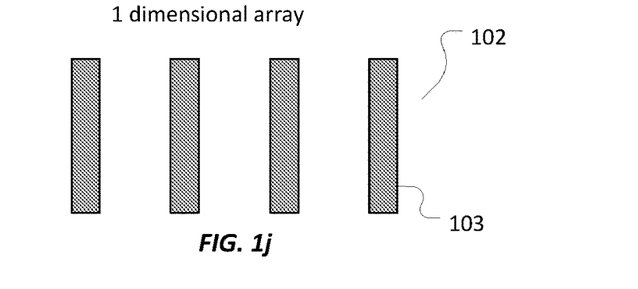

FIG. 1j illustrates an example plasmonic layer 102 including plasmonic regions 103 shaped as strips separated by non-plasmonic strips, creating a 1-dimensional array of separated plasmonic regions.

As can be seen the array of plasmonic regions may be regular array with equal spacing between neighbouring plasmonic regions in a first and/or a second direction. Preferably the first and a second directions are orthogonal directions. However the array may have different spacing in the first and second directions.

The present invention also provides a method of fluorescence microscopy including:

providing a sample holder having an upper surface face and a lower surface, the upper surface having a plasmonic layer associated therewith, the plasmonic layer including a periodic array of sub-micron structures;

applying the sample to the upper surface of the sample holder;

illuminating the sample with light so that said light interacts with the sample and sample holder;

receiving light emitted from the sample by fluorescence and forming an image thereof.

The method can further include receiving light after interaction with said sample and sample holder and forming at least one image thereof, wherein at least one localised structural property of the sample is visible in the image based on the colour of the received light. Such imaging is described in PCT/AU2018/050496 in greater detail. Herein an image formed in this manner termed a colour contrast image. Advantageously, in this way a sample mounted on the sample holder can be imaged using fluorescence microscopy in addition to using colour contrast imaging.

Figure 3B:
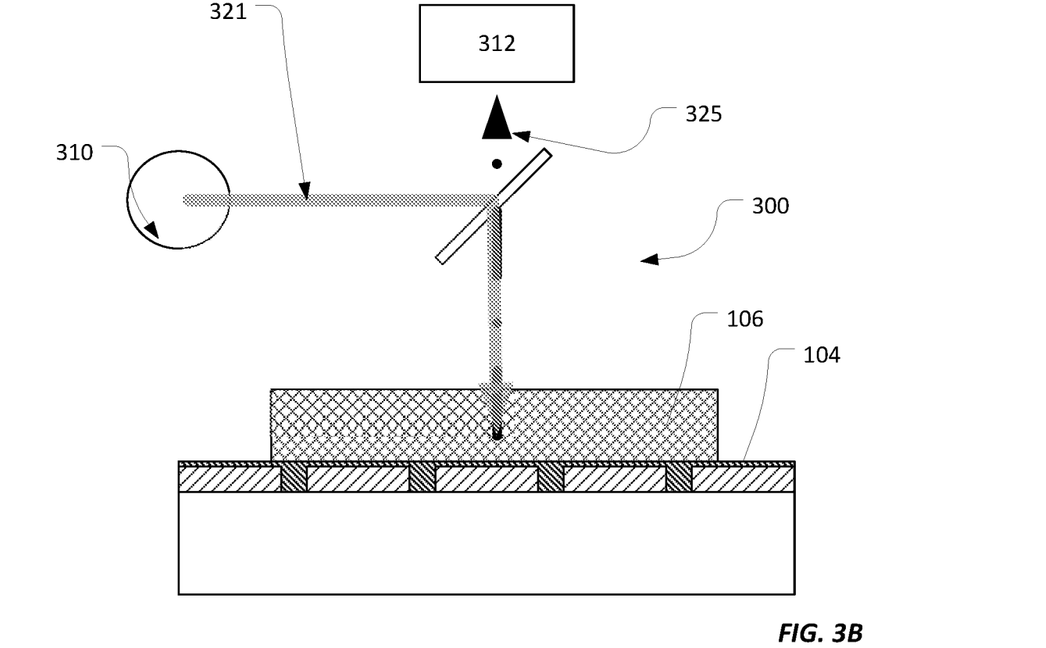
FIG. 3B is a schematic diagram of a system illustrating how the embodiment of FIG. 3A can be used to perform fluorescence microscopy.

As will be appreciated by those skilled in the art, fluorescence microscopy is typically performed with a reflected light microscopy arrangement, as it is necessary (or desirable) to illuminate the sample from the same side on which fluorescence induced in the sample is to be imaged. Accordingly the schematic arrangement of FIG. 3A can be also used for fluorescence imaging of the same sample as illustrated in FIG. 3B. In this example the light source 310 emits incident light 321 to illuminate the sample 106. The illumination causes the sample 106 to fluoresce. Light 325 emitted from the sample by fluorescence is captured by an imaging system 312 that enables creation of a fluorescence image of the sample.

As will be known to those skilled in the art fluorescence microscopy may require specialised sample preparation and labelling techniques. Wavelength selective illumination and image capture techniques may also be used. Details of general fluorescent sample preparation, illumination techniques or image capture techniques used in fluorescence microscopy images will not be described here in order not to obscure the details of the present invention.

In some embodiments fluorescence and colour contrast microscopy can be performed on the same sample serially or at the same time. In the case that they are performed serially, the image formed from the light emitted from the sample by fluorescence can be formed in a first time period, and the colour contrast image can be formed in a second time period.

It may be necessary or advantageous to use specific illumination properties in each type of microscopy, in this case the light used in the colour contrast imaging can have a different illumination spectrum than that used in fluorescence imaging. This may require using two light sources interchangeably or a common light source which is filtered differently in each time period. However in some cases the same spectra may be used.

Figure 3C:
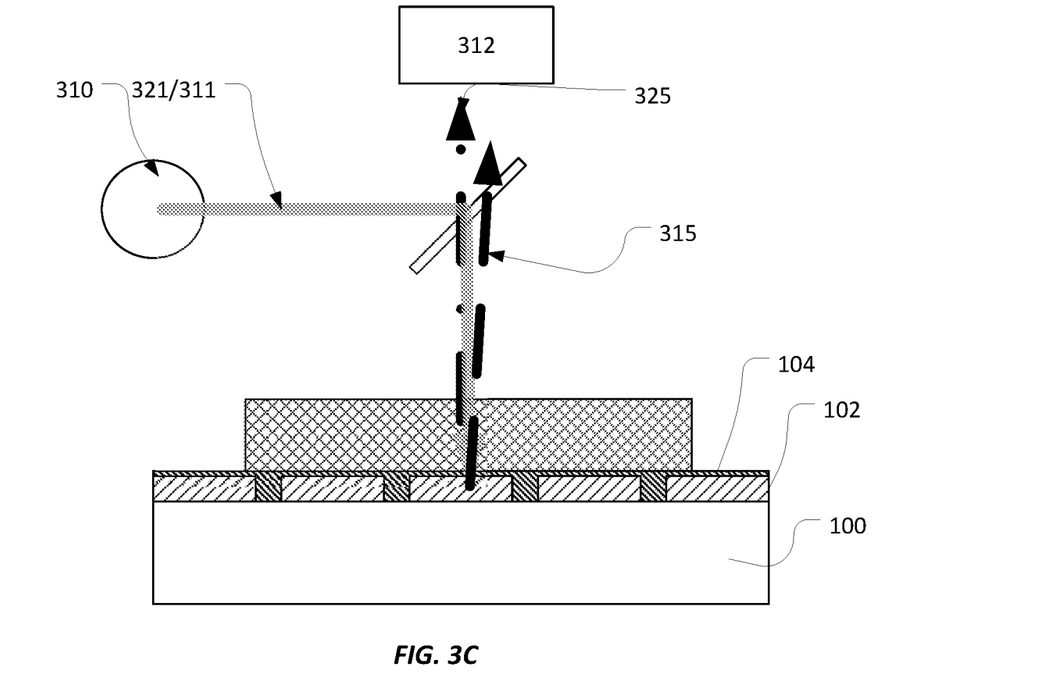
FIG. 3C illustrates schematically one example system in which fluorescence and colour contrast microscopy can be performed together.

FIG. 3C illustrates schematically an example where fluorescence imaging and colour contrast imaging of the same sample is performed using the system of FIGS. 3A and 3B. In this example the light source 310 emit light 321/311 (which may have the same spectrum or different spectra) to illuminate the sample 106. The illumination causes the sample 106 to fluoresce and also interacts with the sample and the plasmonic layer 102 of the sample holder 100. Received light 325 is emitted from the sample by fluorescence and received light 315 is reflected by the sample holder 100. Received light 315/325 is captured by an imaging system 312 to enable creation of both a fluorescence image and a colour contrast image of the sample. As noted above the emission of light 311 and 321 may be simultaneous or not.

Figure 3D:
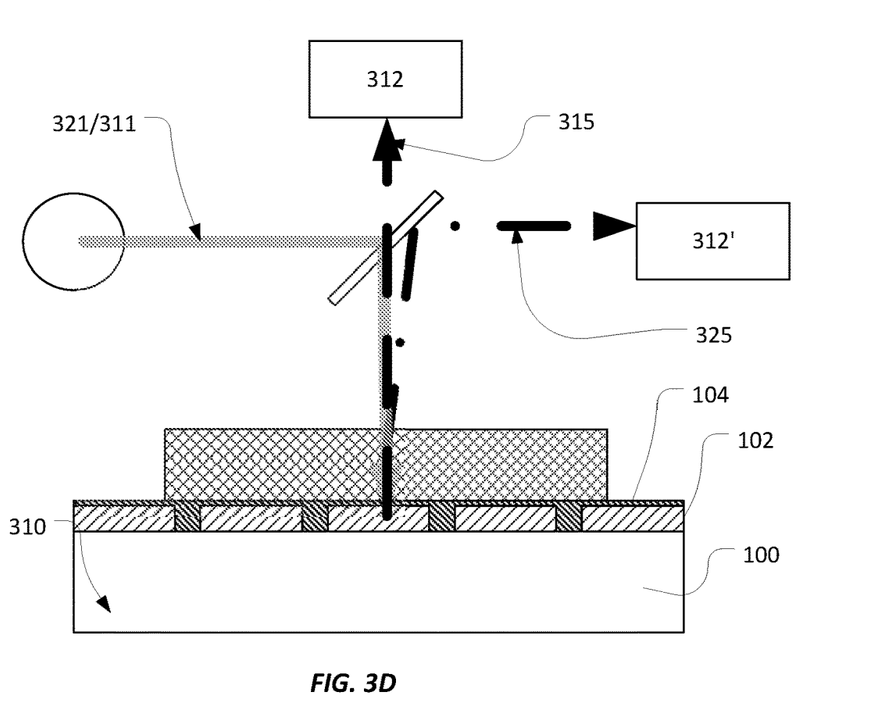
FIG. 3D illustrates schematically another example system in which fluorescence and colour contrast microscopy can be performed together.

FIG. 3D illustrates schematically an example where fluorescence imaging and colour contrast imaging of the same sample is performed using the system of FIGS. 3A and 3B. In this example the light source 310 emit light 321/311 (which may have the same spectrum or different spectra) to illuminate the sample 106. The illumination causes the sample 106 to fluoresce and also interacts with the sample and the plasmonic layer 102 of the sample holder 100. Received light 325 is emitted from the sample by fluorescence and received light 315 is reflected by the sample holder 100. Received light 315 is captured by a first imaging system 312 to enable creation of a colour contrast reflection image. Received light 325 is captured by a second imaging system 312' to enable creation of a fluorescence image of the same sample. As noted above the emission of light 311 and 321 may be simultaneous or not. For FIGS. 3C and 3D, in some instances a sample may fluoresce during colour contrast microscopy when it is not desired. This can generally be dealt with by filtering out the fluorescent wavelength(s) at image formation or by not illuminating the sample in a wavelength bend that causes fluorescence. Fluorescence occurs at very specific wavelengths as it is generated via specific optical transitions within a fluorescent tag, and therefore the fluorescence appears as a line (or lines) in a received spectrum. These characteristic line(s) can be isolated from the smoother continuous background spectrum of the colour contrast image. In the event that a fluorescence line happens to coincide with a strong wavelength peak in the received colour spectrum in the colour contrast image this can be corrected by using a nanoslide with a different separation sub-micron structures or in the event that the nanoslide being used has a different separation between sub-micron structures in different directions, changing the polarisation of the illumination of the colour contrast image. As set out in the Applicant's co-pending Australian patent applications, filed on the same day as the present application and entitled "Automated method of identifying a structure" and "Method of identifying a structure", this will alter the received light spectrum in the colour contrast image but not the fluorescence image.

Images captured by the present methods can be used individually or together to draw conclusions about the sample. In some embodiments of the present invention the method can include spatially correlating an image formed from the light emitted from the sample by fluorescence, and a colour contrast image.

This can be performed by generating a combined image showing both colour contrast information and fluorescence images. Multiple images formed from the light emitted from the sample by fluorescence (e.g. one for each fluorescence wavelength) and/or multiple colour contrast images (captured at different polarisations) may be combined into a single image.

The combination may be performed optically (e.g. during optical image formation) or digitally (e.g. by combining data values representing said images). It will be understood that the invention disclosed and defined in this specification extends to all alternative combinations of two or more of the individual features mentioned or evident from the text or drawings. All of these different combinations constitute various alternative aspects of the invention.

The invention claimed is:

1. A sample holder for use in an optical microscope, the sample holder including:
   a plasmonic layer defining a periodic array of sub-micron structures;
   wherein the sample holder is configured to support an object such that the periodic array of sub-micron structures is located on a same side of the sample holder as the object when supporting the object;
   wherein the periodic array of sub-micron structures comprise an array of separated plasmonic regions; and
   wherein the sample holder includes an optically clear protective layer on an upper side of the plasmonic layer to isolate the plasmonic layer from the object;
   wherein the object to be supported is a biological sample, the optically clear protective layer providing a polar surface to aid in adherence of the biological sample to the support surface.

2. The sample holder of claim 1, wherein the plasmonic regions are islands of plasmonic material.

3. The sample holder of claim 1, wherein the sub-micron structures are arranged in a periodic array with a separation between the sub-micron structures in the range of 200 nm to 500 nm, and/or the sub-micron structures have a largest dimension in the range of 50 nm to 300 nm or the sub-micron structures are regions of plasmonic material between about 100 nm and 200 nm across.

4. The sample holder of claim 1, wherein the periodic array is a 1-dimensional or 2 dimensional array.

5. The sample holder of claim 1, wherein the plasmonic regions are shaped as any one or more of: a circle, a torus, an ellipse, a cross, rectangle, square, line, strip, and/or the plasmonic layer is formed from one or more metals selected from any one of: Al, Ag, Au, Ni, Pt and Pd, and/or the plasmonic layer has a thickness in the range of 20 nm to 300 nm.

6. The sample holder of claim 1, wherein the array of separated plasmonic regions are arranged in an array with equal or unequal spacing between neighbouring plasmonic regions in a first direction and a second direction.

7. The sample holder as claimed in claim 6, wherein the first direction and the second directions are orthogonal directions.

8. The sample holder of claim 1, wherein the sample holder includes a substrate connected to at least a portion of a first surface of the plasmonic layer to provide mechanical support for the plasmonic layer.

9. The sample holder of claim 1, wherein the optically clear protective layer has a thickness less than 150 nm.

10. The sample holder of claim 1, wherein the optically clear protective layer has a thickness less than 80 nm, and/or the optically clear protective layer includes any one or more of: silicon oxide, silicon nitride, transparent metal oxide, and a polymer.

11. The sample holder of claim 1, wherein the sample holder is arranged in use to enable light, which is transmitted through the sample to the plasmonic layer to be reflected from the sample holder for the creation of images comprising the reflected light, and/or the incident light illuminates the sample and the sample holder and interacts with the sample and the plasmonic layer.

12. The sample holder of claim 11 wherein the reflected light includes a characteristic spectra in which each colour is dependent on the localised dielectric constant of a sample held on the sample holder.

13. A system for forming an image, the system including a reflected light microscope having:
an image forming system; and
an illumination system, wherein the system includes the sample holder of claim 1.

14. The system of claim 13, including an image capture system to generate at least one digital image of the object.

15. The sample holder of claim 1, wherein the plasmonic layer extends over a region of the sample holder and the periodic array of sub-micron structures is arranged to fill, by area, not more than 80% of said region.

16. The sample holder of claim 15, wherein the region of the sample holder is the entire area of the sample holder.

17. The sample holder of claim 1, wherein the optically clear protective layer is a glass-like material.

18. The sample holder of claim 1 in combination with an object to be imaged, the object supported on the optically clear protective layer.

19. The sample holder of claim 1 in combination with a biological sample to be imaged, the biological sample supported on the optically clear protective layer.

20. The sample holder of claim 1, wherein the optically clear protective layer comprises a capping layer of hydrogen silsesquioxane (HSQ) or a metal oxide.

21. A method of imaging a sample comprising:
providing a sample holder having an upper surface and a lower surface, the upper surface having a plasmonic layer and an optically clear protective layer on an upper side of the plasmonic layer associated therewith, the plasmonic layer including a periodic array of sub-micron structures;
applying the sample to the upper surface of the sample holder, such that the sample is applied to an upper side of the optically clear protective layer, wherein the sample is a biological sample, and wherein the optically clear protective layer provides a polar surface to aid in adherence of the biological sample to the support surface;
illuminating the sample with light so that said light interacts with the sample and the sample holder; and
receiving light emitted from the sample by fluorescence and forming an image thereof, wherein at least one localised structural property of the sample is visible in the image based on the colour of the received light.

22. The method of claim 21, wherein an image formed from the light emitted from the sample by fluorescence is formed in a first time period, and an image formed from light after interaction with said sample and said sample holder are formed in a second time period.

23. The method of claim 22, wherein the method includes illuminating the sample using light having a first illumination spectrum in the first time period and a second illumination spectrum in the second time period.

24. The method of claim 23, wherein the first illumination spectrum is selected on the basis of a fluorescence property of the sample, and/or wherein the first and second illumination spectra are different.

25. The method of claim 21, wherein receiving light emitted from the sample by fluorescence includes filtering light received from the sample and/or sample holder to minimise received light from sources other than said fluorescence.

26. The method of claim 21, wherein the method includes illuminating the sample from the side of the sample holder on which the sample is positioned, and receiving light emitted from the sample by fluorescence, and also light which has after interacted with said sample and said sample holder, from the same side as said illumination.

27. The method of claim 21, which further includes spatially correlating an image formed from the light emitted from the sample by fluorescence, and an image formed from light after interaction with said sample and said sample holder, and/or the method further includes forming a combined image including at least one image formed from the light emitted from the sample by fluorescence, and at least one image formed from light after interaction with said sample and said sample holder or the images are combined optically before capture as a digital image or after capture by digital combination.

* * * * *